(12) United States Patent
Minematsu

(10) Patent No.: US 9,787,475 B2
(45) Date of Patent: Oct. 10, 2017

(54) DEVICE, METHOD, AND PROGRAM FOR MESSAGE AUTHENTICATION TAG GENERATION

(71) Applicant: NEC CORPORATION, Tokyo (JP)

(72) Inventor: Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 14/772,594

(22) PCT Filed: Feb. 18, 2014

(86) PCT No.: PCT/JP2014/000810
§ 371 (c)(1),
(2) Date: Sep. 3, 2015

(87) PCT Pub. No.: WO2014/136386
PCT Pub. Date: Sep. 12, 2014

(65) Prior Publication Data
US 2016/0006568 A1  Jan. 7, 2016

(30) Foreign Application Priority Data
Mar. 4, 2013 (JP) .................... 2013-041890

(51) Int. Cl.
H04L 9/32 (2006.01)
H04L 9/06 (2006.01)

(52) U.S. Cl.
CPC .......... *H04L 9/3242* (2013.01); *H04L 9/0643* (2013.01); *H04L 2209/24* (2013.01)

(58) Field of Classification Search
CPC ....... H04L 9/06; H04L 9/0606; H04L 9/0618; H04L 9/0625; H04L 9/0631;
(Continued)

(56) References Cited

U.S. PATENT DOCUMENTS 5,673,318 A  9/1997 Bellare et al.
7,451,310 B2  11/2008 Hall et al.
(Continued)

FOREIGN PATENT DOCUMENTS

JP  63-50223  3/1988
JP  06-315027  11/1994
(Continued)

OTHER PUBLICATIONS

International Search Report, PCT/JP2014/000810, Mar. 18, 2014.

*Primary Examiner* — Theodore C Parsons
(74) *Attorney, Agent, or Firm* — Young & Thompson

(57) ABSTRACT

Provided are a tag generation device, method and program which are capable of parallel execution, need no precomputation, and are capable of reducing block-cipher calls to the minimum necessary using one block cipher key when a tag to be attached to a message is generated. A tag generation device is provided with: an input means (100) which divides a message into a plurality of blocks; an intermediate chunk hash means (101) to which the blocks included in the message are inputted as an object to be processed, and which, in units of a predetermined number of blocks, using one key, executes encipherment processing and post-processing of encipherment on the blocks in parallel to generate an intermediate output, and designates, as a next object to be processed, a message created by coupling the intermediate output and unprocessed blocks; and a final chunk hash means (102) which, when the number of block in the message or the number of blocks in the message created by coupling the intermediate output and the unprocessed block is a predetermined value or less, generates a tag corresponding to the message.

7 Claims, 8 Drawing Sheets

(58) Field of Classification Search
CPC ... H04L 9/0637; H04L 9/0643; H04L 9/0675; H04L 9/0693; H04L 9/28; H04L 9/32; H04L 9/3223; H04L 9/3236; H04L 9/3242; H04L 9/3244; H04L 2209/12; H04L 2209/125; H04L 2209/20; H04L 2209/24; H04L 2209/38; H04L 63/04; H04L 63/0428; H04L 63/0435; H04L 63/08; H04L 63/12; H04L 63/123; H04L 63/126; G06F 21/60; G06F 21/602; G06F 21/606; G06F 21/608; G06F 21/6209; G06F 21/6218; G06F 21/64; G06F 21/72; G06F 2221/2107

See application file for complete search history.

(56) References Cited

U.S. PATENT DOCUMENTS

| | | | | |
|---|---|---|---|---|
| 2002/0051537 | A1* | 5/2002 | Rogaway | H04L 9/0643 380/46 |
| 2007/0245147 | A1 | 10/2007 | Okeya | |
| 2011/0191588 | A1* | 8/2011 | Rogaway | H04L 9/0637 713/170 |

FOREIGN PATENT DOCUMENTS

| | | |
|---|---|---|
| JP | 2007-288514 | 11/2007 |
| WO | WO 2007/052477 | 5/2007 |
| WO | WO 2013/065241 | 5/2013 |

\* cited by examiner $E_K$ : ENCRYPTION FUNCTION OF $n$-BIT BLOCK CIPHER WITH K AS KEY $<<<_k^i$ : $i$-BIT CYCLIC SHIFT OF FIRST $k$-BIT SEQUENCE $\oplus$ : EXCLUSIVE-OR pp : POST-PROCESSING FUNCTION

DEVICE, METHOD, AND PROGRAM FOR MESSAGE AUTHENTICATION TAG GENERATION

TECHNICAL FIELD

The present invention relates to a message authentication technique using a symmetric-key block cipher, and particularly relates to a tag generation device, tag generation method, and tag generation program capable of parallel processing with no need for precomputation before processing start.

BACKGROUND ART

Message authentication is a technique of assuring the authenticity of a message by attaching, to the message, a tag that can be computed only by those who know a secret key. For example, the use of message authentication enables the detection of whether or not communication between two parties sharing a secret key has been tampered with by a third party. A specific example is given below. Let K be a secret key shared by the sender and receiver of a message. For a message M, the sender sends a tag T=MAC (K, M) computed by assigning M and K to a message authentication code (MAC) function F, to the receiver. Having received a message M' and a tag T', the receiver computes a tag T" from the shared key K and M', and checks whether or not the received tag T' and the computed tag T" match. The receiver can thus verify whether or not the message M' is from the stated sender.

One of the message authentication schemes is a CBC-MAC scheme using a block cipher. The term "message authentication scheme" is hereafter referred to as "MAC scheme" or simply "MAC". CBC-MAC is a MAC that uses, as its component, an encryption function E(K, *) of an n-bit block cipher with K as a key. CBC-MAC operates as follows. Let |M| be the length of a message M. In the case where |M| is a multiple of n, M is first divided into blocks M[1], M[2], . . . , M[m] (|M[1]|= . . . =|M[m]|=n), where m is the number of blocks. Then, Y[m] is output as a tag through the following computation.

$$Y[1]=E(K,M[1]), Y[2]=E(K,M[2]+Y[1]), \ldots Y[m]=E(K,M[m]+Y[m-1]).$$

Here, 0^n is an n-bit all-zero sequence, and "+" denotes a bitwise exclusive-or (XOR).

In the case where the length of the message is not a multiple of n, the message is first padded to make its length a multiple of n, before applying CBC-MAC. Simple CBC-MAC is easy to be forged when the message length is variable. For example, in the case where Y[1]=E(K, M[1]) is obtained as a tag for M=M[1], a tag generated for M'=(M[1], M[1]+Y[1]) is invariably Y[1].

OMAC described in Non Patent Literature (NPL) 1 is an improvement of CBC-MAC that removes the above-mentioned security drawback. OMAC is equivalent to CMAC recommended by NIST, and so is hereafter referred to as "CMAC". In CMAC, the result of encrypting 0^n is held beforehand, and an intermediate variable of CBC-MAC is changed using the held value only in the encryption of the last block. In detail, CMAC operates as follows. When a message M is given, M is divided into blocks M[1], M[2], . . . , M[m] (|M[1]|= . . . =|M[m−1]|=n, 1≤|M[m]|≤n), and Y[m] is output as a tag using the following Formula 1.

$$L=E(K,0^n),$$

$$Y[1]=E(K,M[1]), Y[2]=E(K,M[2]+Y[1]), \ldots,$$
$$Y[m-1]=E(K,M[m-1]+Y[m-2]),$$

$$Y[m]=E(K,M[m]+Y[m-1]+2L) \text{ if } |M[m]|=n,$$

$$Y[m]=E(K,(M[m]\|10^*)+Y[m-1]+4L) \text{ if } |M[m]|\leq n \quad \text{(Formula 1)}.$$

Here, (M[m]||10*) is an n-bit sequence obtained by padding M[m] with 10 . . . 0. 2L is multiplication by a generator of a finite field (Galois field) GF(2^n) where L is an element of the field, and corresponds to multiplication by 2 in the finite field. 4L denotes 2(2L), and corresponds to multiplication by 2 twice. FIG. 5 is an explanatory diagram illustrating tag output in CMAC. In FIG. 5, $E_K$ denotes an encryption function of an n-bit block cipher with K as a key. "||" denotes a concatenation operator for a bit string.

CMAC has the feature that, by computing L in Formula 1 beforehand, any message M can be processed with ceiling (|M|/n) block cipher calls. One block typically needs at least one block cipher call, according to security definition. Hence, this number of block cipher calls is a minimum number, except for precomputation.

TMAC described in NPL 2 and XCBC described in NPL 3 are approximately the same process as CMAC mentioned above but, instead of using 2L or 4L in the last block, use a value generated from a key other than the block cipher key K. TMAC and XCBC therefore do not need precomputation of E(K, 0^n), but have a drawback in that the MAC key is longer than that of CMAC.

GCBC described in NPL 5 is an improvement for omitting the precomputation in CMAC while using only the block cipher key K as the MAC key. In GCBC and particularly GCBC1 described in NPL 5, Y[m] is output as a tag using the following Formula 2.

When |M|>n, $$Y[1]=E(K,M[1]), Y[2]=E(K,M[2]+Y[1]), \ldots,$$
$$Y[m-1]=E(K,M[m-1]+Y[m-2]),$$

$$Y[m]=E(K,M[m]+(Y[m-1]<<<1)) \text{ if } |M[m]|=n,$$

$$Y[m]=E(K,(M[m]\|10^*)+(Y[m-1]<<<2)) \text{ if } |M[m]|\leq n \quad \text{(Formula 2)}.$$

Here, (Y[m−1]<<<i) is the value obtained by shifting (logical shift) Y[m−1] left by i bits, where the right bits are filled in with zeros. When |M|=n, Y[2] is output as a tag in GCBC1 using the following formula.

$$Y[1]=E(K,M[1]), Y[2]=E(K,(10^n-1)+(Y[1]<<<2)).$$

When |M|<n, Y[2] is output as a tag in GCBC1 using the following formula.

$$Y[1]=E(K,(M[1]\|10^*)), Y[2]=E(K,(0^n)+(Y[1]<<<2)).$$

In GCBC1, when |M|>n, the process is completed with ceiling(|M|/n) block cipher calls with no need for precomputation. When |M|≤n, on the other hand, two block cipher calls are needed. FIG. 6A is an explanatory diagram illustrating tag output in GCBC in the case where the number m of blocks of the message is 2 or more. In FIG. 6A, "<<i" denotes an i-bit logical left shift. FIG. 6B is an explanatory diagram illustrating tag output in GCBC in the case where the number m of blocks of the message is 1.

Each of the schemes described above makes one block cipher call per message block, and so is incapable of processing blocks in parallel.

PMAC described in NPL 4 is a MAC scheme capable of processing blocks in parallel. When a message M is given, M is divided into blocks M[1], M[2], . . . , M[m] (|M[1]|= . . . =|M[m−1]|=n, 1≤|M[m]|≤n), as in CMAC. Then, T is output as a tag using the following Formula 3. In the formula, 3L denotes 2L+L.

$L=E(K,0^n)$, $S[i]=E(K,(2^i)L+M[i])$ for $i=1,\ldots,m-1$ $V=S[1]+S[2]+\ldots+S[m-1]$ $T=E(K,V+M[m]+2^{(m-1)}L3L)$ if $|M[m]|=n$, $T=E(K,V+(M[m]\|10^*)+2^{(m-1)}L(3^2)L)$ if $|M[m]|\neq n$ (Formula 3).

PMAC differs from CBC-MAC, CMAC, and GCBC in that it is parallelizable except for the last one block. Moreover, PMAC can complete the entire process with ceiling (|M|/n) block cipher calls if L is precomputed, as with CMAC. FIG. 7 is an explanatory diagram illustrating tag output in PMAC. In FIG. 7, $2^{m-1}L$, i.e. $2^iL$, denotes multiplication by $2^i$ in a finite field GF($2^n$) of L, and $3^2L$, i.e. $3^iL$, denotes multiplication by $3^i$ in the finite field GF($2^n$) of L.

Other MAC schemes that are parallelizable include XOR MAC described in NPL 6. In XOR MAC, however, input to a block cipher includes information other than an input message, such as block indices. Accordingly, XOR MAC typically needs ceiling(|M|/m) block cipher calls (for some m<n) for a message M, which is larger than the number of block cipher calls in PMAC.

The schemes described in NPL 1, NPL 4, and NPL 5 are MAC schemes capable of computing output from only a secret key and a message. Such schemes are called deterministic MACs.

PAT described in NPL 7 is known as another MAC that is parallelizable. However, PAT needs random number generation for MAC generation, and belongs to randomized MACs. In randomized MACs, a random number used needs to be included in part of output, which causes an increase in output size as compared with deterministic MACs.

There is a message authentication device that combines a block cipher and part of its components to attain higher speed than existing block cipher authentication schemes, exhibit theoretical security, and improve efficiency in the preprocessing and the amount of memory used (for example, see Patent literature (PTL) 1). There is also a device that reads a plurality of blocks of an input message in parallel and reduces each block to decrease the number of data inputs to the subsequent encrypter, thus improving the authenticator generation speed (for example, see PTL 2).

CITATION LIST

Patent Literature

PTL 1: Domestic Re-publication of PCT International Application No. WO2007/052477
PTL 2: Japanese Patent Application Publication No. 63-050223
PTL 3: U.S. Pat. No. 7,451,310

Non Patent Literature

NPL 1: T. Iwata, K. Kurosawa, OMAC: One-Key CBC MAC. Fast Software Encryption-FSE 2003, Lecture Notes in Computer Science (LNCS) vol. 2887, February 2003

NPL 2: Kaoru Kurosawa, Tetsu Iwata: TMAC: Two-Key CBC MAC. IEICE Transactions vol. E87-A, No. 1: pp. 46-52 (2004)
NPL 3: John Black, Phillip Rogaway: CBC MACs for Arbitrary-Length Messages: The Three-Key Constructions. CRYPTO 2000: vol. 1888, pp. 197-215
NPL 4: P. Rogaway. Efficient Instantiations of Tweakable Blockciphers and Refinements to Modes OCB and PMAC, Advances in Cryptology-ASIACRYPT '04. LNCS vol. 3329, pp. 16-31, 2004
NPL 5: M. Nandi. Fast and Secure CBC-Type MAC Algorithms, Fast Software Encryption-FSE '09. LNCS vol. 5665, pp. 375-393, 2009
NPL 6: M. Bellare, R. Guerin, and P. Rogaway. XOR MACs: New methods for message authentication using finite pseudorandom functions. In CRYPTO '95, volume 963 of LNCS, pages 15-28. Springer-Verlag, 1995
NPL 7: D. E. Daykin. On the Rank of the Matrix f(A) and the Enumeration of Certain Matrices over a Finite Field, Journal of the London Mathematical Society, 1960, pp. 36-42

SUMMARY OF INVENTION

Technical Problem

Here, a MAC scheme in which the number of necessary block cipher calls for a message M of two or more blocks except for precomputation is ceiling(|M|/n) is said to be "quasi-optimal" in computation cost, and a MAC scheme having the same feature for a message of one or more blocks is said to be "optimal" in computation cost.

CMAC and PMAC are optimal in computation cost, but need precomputation of $L=E(K, 0^n)$, as mentioned above. For example in the case where the key is frequently changed or a large number of different keys are used for fast processing, the cost of precomputation becomes problematic. Besides, memory usage may be restricted in a computational environment in which resources are limited, such as a sensor network. CMAC and PMAC are not suitable in such an environment because it is hard to hold L.

GCBC makes precomputation unnecessary and overcomes the above-mentioned problem, by limiting its achievement in computation cost to quasi-optimality while keeping the number of keys to one. However, GCBC is not parallelizable, as with CMAC.

Thus, none of these MAC schemes satisfies all of the following requirements 1 to 4:

1. quasi-optimal computation cost, that is, a message M of m blocks can be processed with m block cipher calls if m≥2;
2. parallelizability;
3. one block cipher key; and
4. no precomputation such as $L=E(K, 0^n)$.

The present invention therefore has an object of providing a block cipher-based deterministic MAC scheme that satisfies these four conditions. In detail, the present invention has an object of providing a tag generation device, tag generation method, and tag generation program that are parallelizable, need no precomputation, use one block cipher key, and require a minimum number of block cipher calls, when generating a tag to be attached to a message.

Solution to Problem

A tag generation device according to the present invention includes:

input unit which divides a message into a plurality of blocks;

intermediate chunk hash unit which receives blocks included in the message as a processing target, performs encryption processing and post-processing of encryption for blocks using one key in units of a predetermined number of blocks in parallel to generate an intermediate output, and repeats the encryption processing and the post-processing of encryption on a message obtained by concatenating the intermediate output and unprocessed blocks as a next processing target; and last chunk hash unit which, in the case where the number of blocks of the message or the number of blocks of the message obtained by concatenating the intermediate output and the unprocessed blocks is less than or equal to a predetermined value, performs the encryption processing and the post-processing of encryption on the message to generate a tag.

A tag generation method according to the present invention includes:

dividing a message into a plurality of blocks;

receiving blocks included in the message as a processing target, performing encryption processing and post-processing of encryption for blocks using one key in units of a predetermined number of blocks in parallel to generate an intermediate output, and repeating the encryption processing and the post-processing of encryption on a message obtained by concatenating the intermediate output and unprocessed blocks as a next processing target; and performing, in the case where the number of blocks of the message or the number of blocks of the message obtained by concatenating the intermediate output and the unprocessed blocks is less than or equal to a predetermined value, the encryption processing and the post-processing of encryption on the message to generate a tag.

A non-transitory computer readable medium storing a tag generation program, according to the present invention, for causing a computer to execute:

dividing a message into a plurality of blocks;

receiving blocks included in the message as a processing target, performing encryption processing and post-processing of encryption for blocks using one key in units of a predetermined number of blocks in parallel to generate an intermediate output, and repeating the encryption processing and the post-processing of encryption on a message obtained by concatenating the intermediate output and unprocessed blocks as a next processing target; and in the case where the number of blocks of the message or the number of blocks of the message obtained by concatenating the intermediate output and the unprocessed blocks is less than or equal to a predetermined value, performing the encryption processing and the post-processing of encryption on the message to generate a tag.

Advantageous Effects of Invention

According to the present invention, when generating a tag to be attached to a message, such tag generation that is parallelizable, needs no precomputation, uses one block cipher key, and requires a minimum number of block cipher calls can be realized.

DESCRIPTION OF EMBODIMENTS

Exemplary Embodiment 1

The following describes an exemplary embodiment 1 of the present invention with reference to drawings.

In this exemplary embodiment, unless otherwise noted, "+" denotes a bitwise exclusive-or, the length of one block is n bits, $|X|$ denotes the bit length of a binary sequence X, and $|X|\_n$ denotes $\text{ceiling}(|X|/n)$, that is, $|X|\_n$ denotes the number of blocks when X is divided into n-bit blocks. Moreover, $X=(X[1], X[2], \ldots, X[i])$ denotes that X includes i blocks. In the case where $|X|$ is not a multiple of n, the length of the last block is less than n. The last block of X in this case is a partial block.

In this exemplary embodiment, when an n-bit block cipher is denoted by E and its key by K, a ciphertext generated from an n-bit plaintext X using the key K is written as $E(K, X)$. In this exemplary embodiment, K is a single key, and accordingly $E(K, X)$ is abbreviated as $E(X)$ unless otherwise noted.

In this exemplary embodiment, a positive integer u greater than or equal to 2 is defined as a parameter. In actual use environments, the highest computation efficiency is attained by setting the positive integer u to be equal to or a multiple of the number of parallelizable units.

Figure 1:
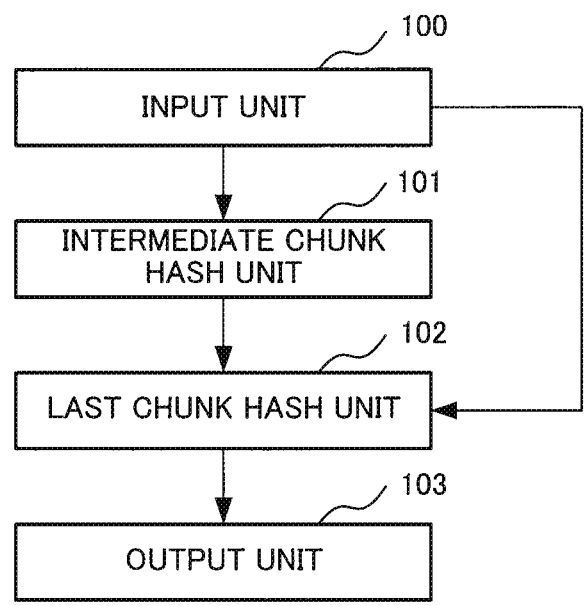
FIG. 1 is a block diagram illustrating the structure of Exemplary embodiment 1 of a tag generation device according to the present invention.

FIG. 1 is a block diagram illustrating the structure of the exemplary embodiment 1 of a MAC tag generation device (hereafter simply referred to as "tag generation device") according to the present invention.

The MAC tag generation device according to the present invention includes input unit 100, intermediate chunk hash unit 101, last chunk hash unit 102, and output unit 103.

The input unit 100 receives a message M that is subjected to tag generation. The message M is any bit string. The input unit 100 receives the message M, for example, from a character input device such as a keyboard.

The intermediate chunk hash unit 101 hashes an $n(u+1)$-bit input to n bits using an n-bit block cipher E, where u is a positive integer greater than or equal to 2.

In detail, the intermediate chunk hash unit 101 first receives $n(u+1)$ bits, i.e. $u+1$ n-bit blocks, and encrypts u blocks from among the $u+1$ blocks using the n-bit block cipher E to obtain u ciphertexts. The intermediate chunk hash unit 101 then performs post-processing of encryption on the obtained u ciphertexts. As the post-processing of encryption, the intermediate chunk hash unit 101 in this exemplary embodiment applies each of the u ciphertexts to a post-processing function, to obtain a post-processing output block for each ciphertext. Lastly, the intermediate chunk hash unit 101 computes an exclusive-or of an exclusive-or of the u post-processing output blocks and the $(u+1)$th block, to obtain an n-bit output (hereafter referred to as "intermediate output").

The intermediate chunk hash unit 101 holds beforehand a set of a post-processing functions $pp(0, X)$, $pp(1, X)$, ..., $pp(a-1, X)$ that each have an n-bit binary sequence X as an input. Each $pp(i, X)$ has an n-bit output, and a is greater than or equal to $u+2$. Here, i is a parameter representing an index.

The positive integer u and the post-processing function pp are stored beforehand in a storage device (not illustrated) such as memory included in the MAC tag generation device.

When the input is X ($=X[1], X[2], ..., X[u+1]$ ($|X[i]|=n$ for all $i=1, ..., u+1$)), the intermediate chunk hash unit 101 outputs the computation result of the following Formula 4 using the set of post-processing functions.

$$pp(0,E(X[1]))+pp(1,E(X[2]))+ \ldots +pp(u-1,E(X[u]))+X[u+1] \quad \text{(Formula 4)}.$$

For an n-bit uniform random number R and any non-empty subset $A=\{i\_1, ..., i\_t\}$ of a set $\{0, 1, ..., a-1\}$, the set of pp functions has the feature that the probability expressed by the following Formula 5 has a small upper bound for any y.

$$Pr[pp(i\_1,R)+pp(i\_2,R)+ \ldots +pp(i\_t,R)=y] \quad \text{(Formula 5)}.$$

Here, Pr(A) denotes the probability that A occurs. For example, the function set having such a feature can be realized by a cyclic shift (partial sequence cyclic shift) for a partial sequence having a special prime number length. Let VL be the first z bits of V which is the output block of the post-processing function (post-processing output block), VR be the latter $(n-z)$ bits of V, and rotate $(i, V)$ be an i-bit left cyclic shift of VL. Then, $pp(i, V)$ can be expressed as shown in Formula 6. Here, z is a prime number, and includes 2 as a primitive root modulo z.

$$pp(i,V)=\text{rotate}(i-1,VL)<<<VR \quad \text{(Formula 6)}.$$

From the study result described in NPL 8, it can be understood that a function set $\{pp(0, *), ..., pp(z-1,*)\}$ has the property that the probability computed according to Formula 5 is at most $2/2^n$. For example, z satisfying the above-mentioned condition is 61, 107.

Figure 2A:
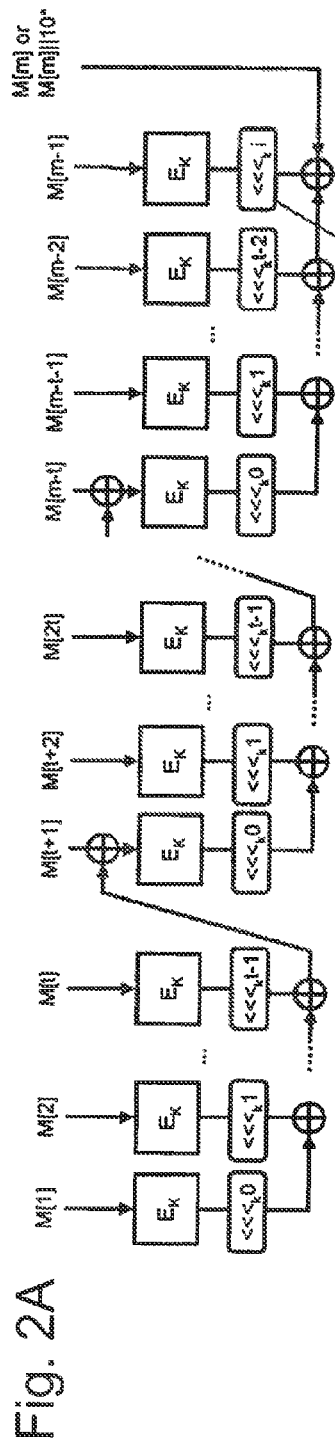
FIG. 2A is an explanatory diagram illustrating the process of a block cipher and a partial sequence cyclic shift in the case where the number m of blocks of the message is 2 or more.
Figure 2B:
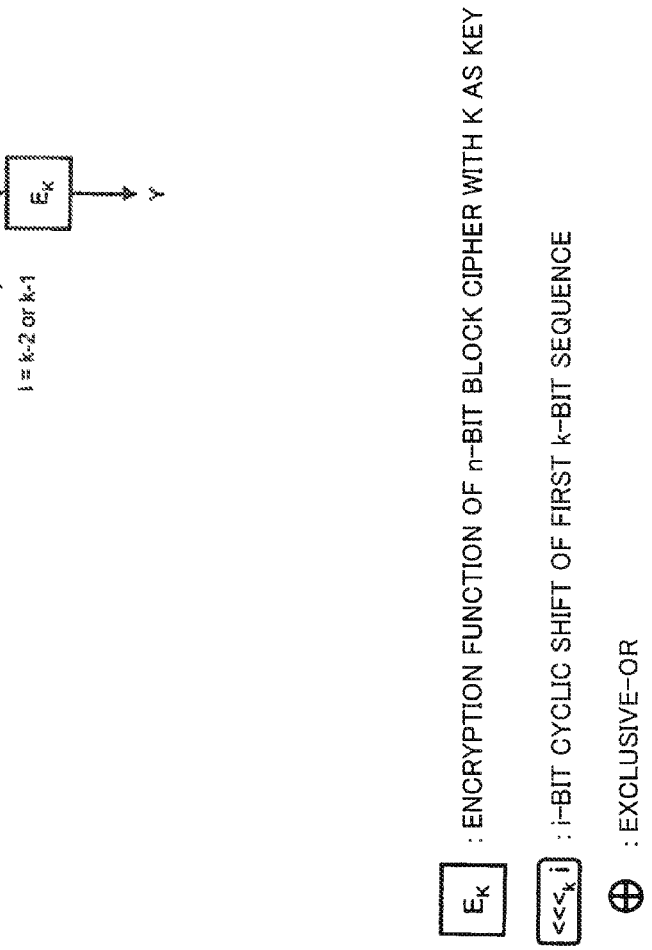
FIG. 2B is an explanatory diagram illustrating the process of the block cipher and the partial sequence cyclic shift in the case where the number m of blocks of the message is 1.
Figure 2B:
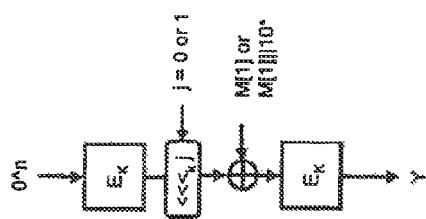

FIG. 2A is an explanatory diagram illustrating the process of the block cipher and the partial sequence cyclic shift in the case where the number m of blocks of the message is 2 or more. In FIG. 2A, "$<<<_k i$" denotes an i-bit cyclic shift of the first k-bit sequence. FIG. 2B is an explanatory diagram illustrating the process of the block cipher and the partial sequence cyclic shift in the case where the number m of blocks of the message is 1.

The last chunk hash unit 102 hashes an input that is greater than or equal to 1 bit and less than or equal to $n(u+2)$ bits, to n bits using the above-mentioned positive integer u as a parameter.

The last chunk hash unit 102 uses the set of post-processing functions $pp(0, *)$, $pp(1, *)$, ..., $pp(a-1, *)$, as with the intermediate chunk hash unit 101. The last chunk hash unit 102 defines cst1 and cst2 as constants with no duplicate from integers 0 to $a-1$ beforehand, where cst1 and cst2 are greater than or equal to the positive integer u. These are necessary to guarantee the difference from the first argument of the pp functions used by the intermediate chunk hash unit 101 and ensure security.

In the case where there is a possibility that the input message is one block, the last chunk hash unit 102 additionally defines two constants cst_z1 and cst_z2. These constants may be any values, e.g. cst_z1=0 and cst_z2=1.

The last chunk hash unit 102 holds cst1, cst2, cst_z1, and cst_z2 beforehand. In detail, cst1, cst2, cst_z1, and cst_z2 are stored beforehand in a storage device such as memory included in the MAC tag generation device.

The detailed process by the last chunk hash unit 102 when the input X is blocks $X[1], X[2], ..., X[x]$ ($|X[i]|=n$ for all $i=1, ..., x-1$, $1 \leq |X[x]| \leq n$) is described below.

In the case where the input X is greater than n bits, i.e. $x \geq 2$, the last chunk hash unit 102 sets S to the following.

$$pp(0,E(X[1]))+pp(1,E(X[2]))+ \ldots +pp(x-3,E(X[x-2])).$$

In the case where $x=2$, the last chunk hash unit 102 sets S to $0^\wedge n$.

If the last block X[x] is exactly n bits, the last chunk hash unit 102 outputs the following.

$$E(S+pp(cst1,E(X[x-1]))+X[x]).$$

If X[x] is a partial block, i.e. less than n bits, the last chunk hash unit 102 outputs the following.

$$E(S+pp(cst2,E(X[x-1]))+X[x]\|10^*).$$

Here, $X[x]\|10^*$ is an n-bit sequence obtained by padding X[x] with 10 ... 0 sequence.

In the case where the input X is less than or equal to n bits, i.e. $x=1$ and $X=X[1]$, on the other hand, if X[1] is exactly n bits, the last chunk hash unit 102 outputs the following.

$$E(pp(cst\_z1,E(0^\wedge n))+X[1]).$$

If X[1] is a partial block, i.e. less than n bits, the last chunk hash unit 102 outputs the following.

$$E(pp(cst\_z2,E(0^\wedge n))+X[1]\|10^*).$$

Here, $0^\wedge n$ is an n-bit all-zero sequence. Any n-bit constant may be used instead of the all-zero sequence.

In the MAC tag generation device, the process by the intermediate chunk hash unit 101 and the process by the last chunk hash unit 102 are performed in combination.

Figure 3A:
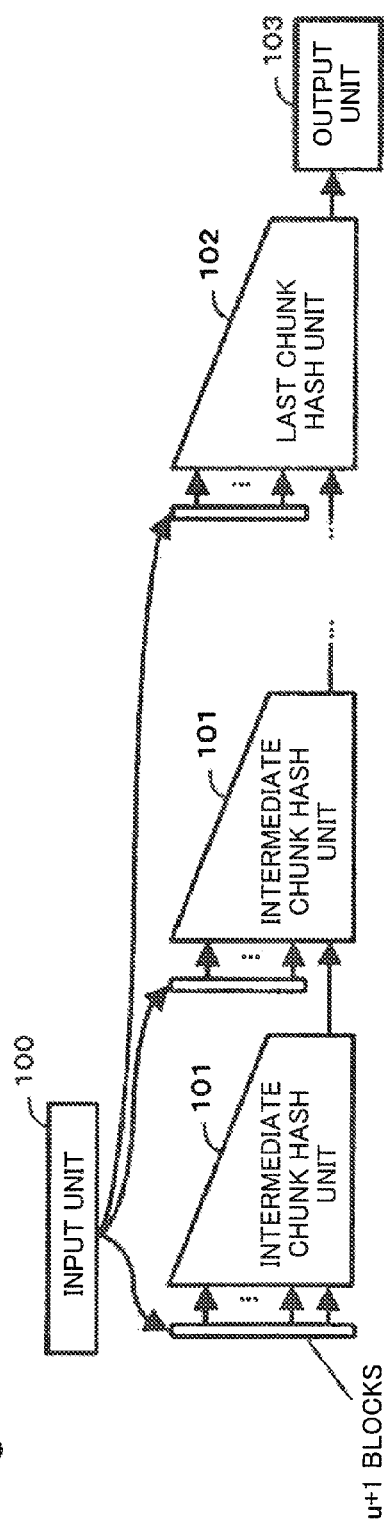
FIG. 3A is an explanatory diagram illustrating the combination of the process by intermediate chunk hash unit and the process by last chunk hash unit.
Figure 3C:
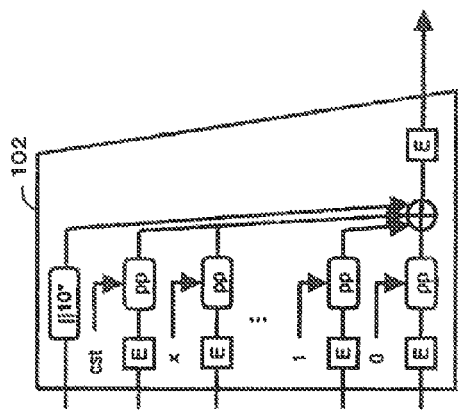
FIG. 3C is an explanatory diagram illustrating the process inside the last chunk hash unit.
Figure 3B:
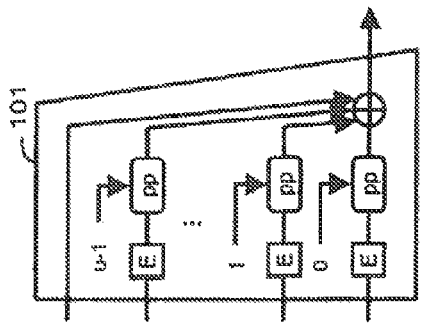
FIG. 3B is an explanatory diagram illustrating the process inside the intermediate chunk hash unit.

FIG. 3A is an explanatory diagram illustrating the combination of the process by the intermediate chunk hash unit 101 and the process by the last chunk hash unit 102. FIG. 3B is an explanatory diagram illustrating the process inside the intermediate chunk hash unit 101. FIG. 3C is an explanatory diagram illustrating the process inside the last chunk hash unit 102.

In detail, when the message M is input to the MAC tag generation device, the input unit 100 extracts the first $u+1$ blocks of the intermediate input, assuming that the message M is the initial value of the intermediate input. The input unit 100 supplies the extracted blocks to the intermediate chunk hash unit 101 as X (=X[1], X[2], ..., X[u+1]), and acquires an output H from the intermediate chunk hash unit 101.

The input unit 100 then concatenates the output H and the (u+2)th and succeeding blocks of the intermediate input, as the new intermediate input. The input unit 100 repeats the above-mentioned process until the intermediate input becomes less than or equal to u+2 blocks.

Lastly, once the intermediate input has become less than or equal to u+2 blocks, the input unit 100 supplies the whole intermediate input to the last chunk hash unit 102. The last chunk hash unit 102 then outputs a tag T as the final output.

In the case where the message M is less than or equal to u+2 blocks from the beginning, only the process by the last chunk hash unit 102 is performed without the process by the intermediate chunk hash unit 101.

In the case where the message is one block, the block cipher is called twice. In the case where the message is longer, on the other hand, the input to the last chunk hash unit 102 is not one block, and accordingly no excess block cipher call takes place. This indicates that, except in the case where the message is one block, the number of blocks of the message and the number of block cipher calls match and quasi-optimal computation cost is achieved.

The output unit 103 outputs the tag T output from the last chunk hash unit 102, to a display device, a printer, or the like.

The input unit 100, the intermediate chunk hash unit 101, the last chunk hash unit 102, and the output unit 103 are, for example, realized by a computer operating according to a tag generation program. In this case, a CPU reads the tag generation program and, according to the program, operates as the input unit 100, the intermediate chunk hash unit 101, the last chunk hash unit 102, and the output unit 103. Alternatively, the input unit 100, the intermediate chunk hash unit 101, the last chunk hash unit 102, and the output unit 103 may be realized by separate hardware.

The following describes the operation in this exemplary embodiment.

Figure 4:
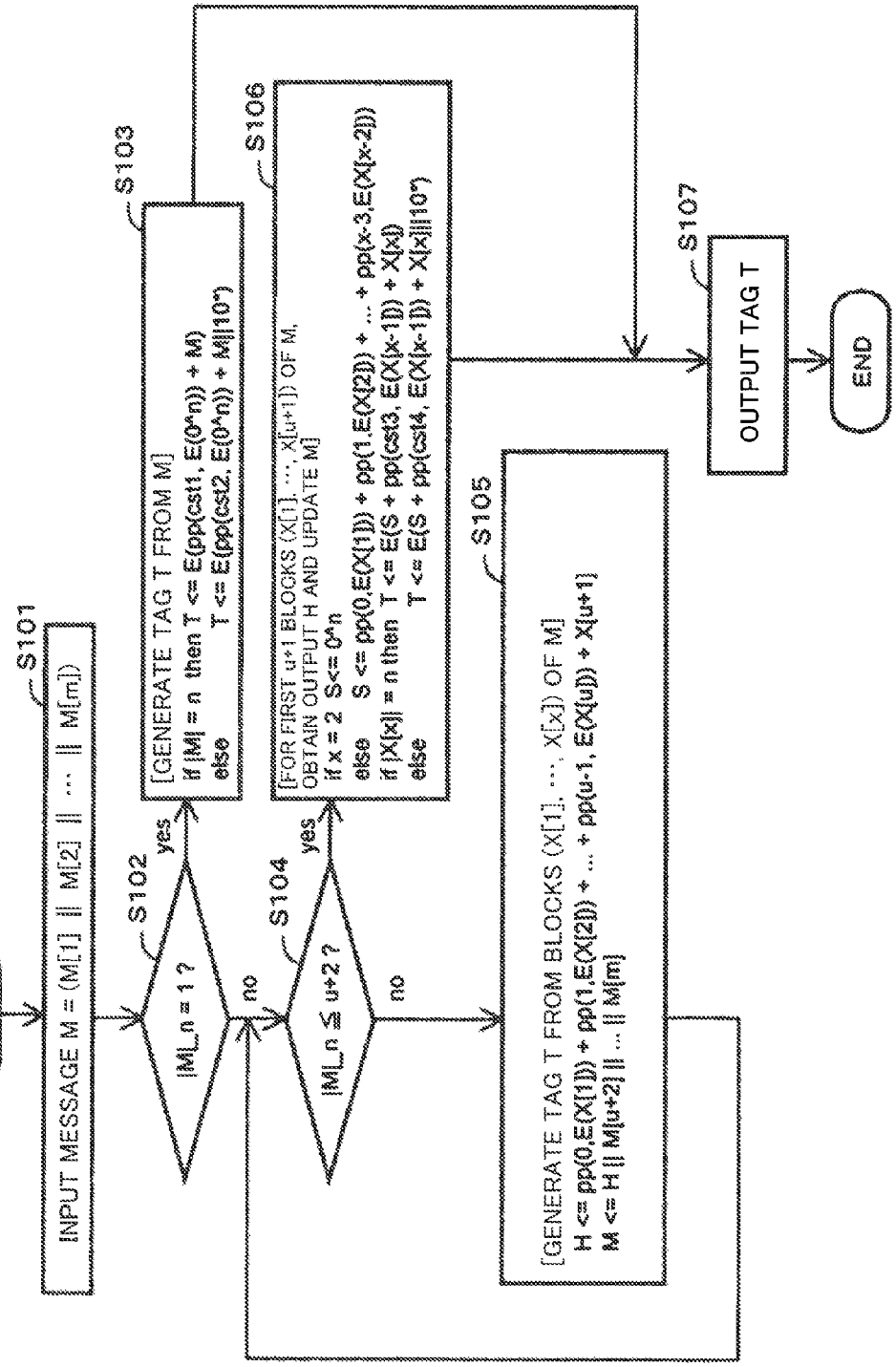
FIG. 4 is a flowchart illustrating the operation of the tag generation device in exemplary embodiment 1.
Figure 5:
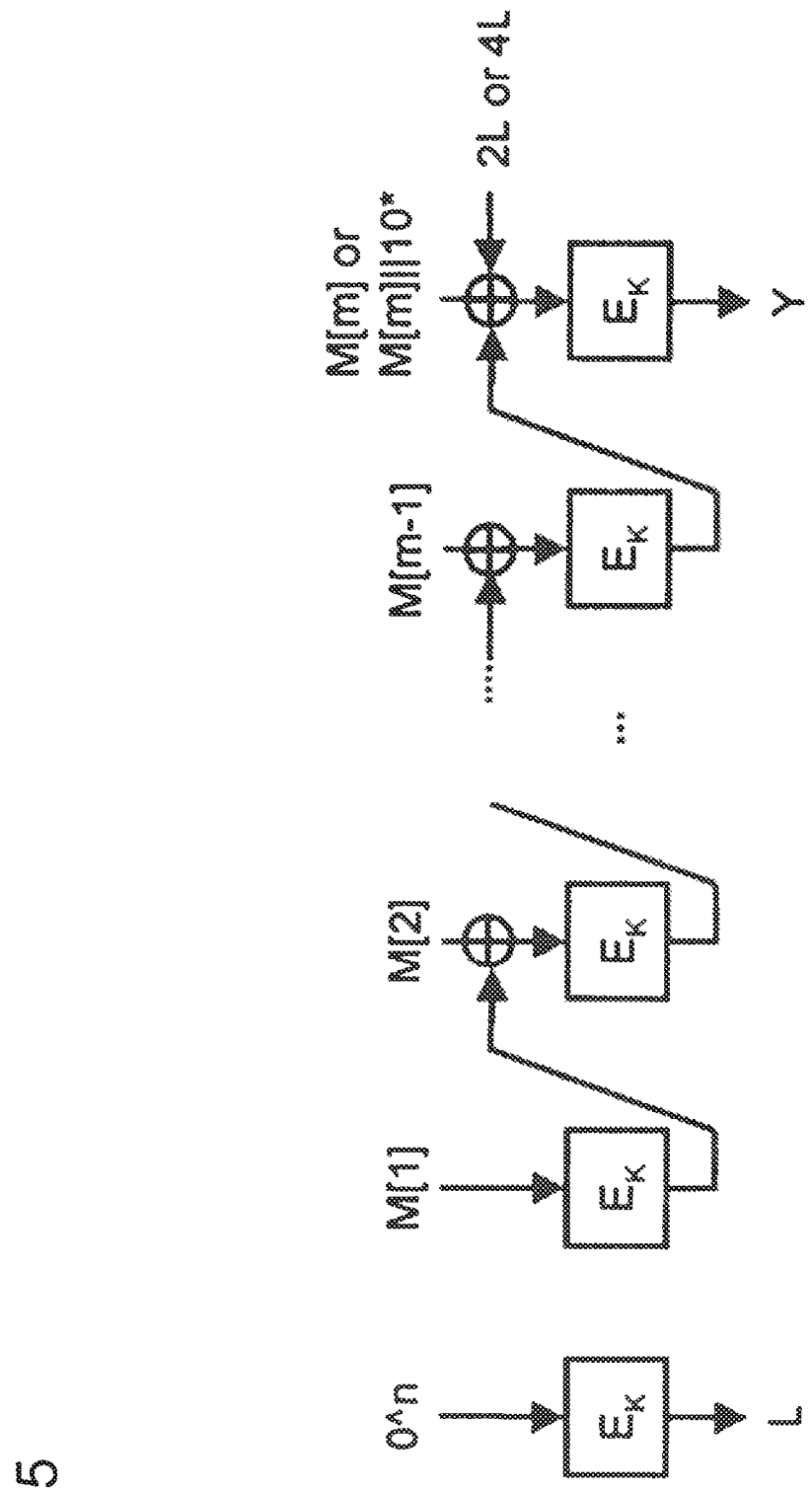
FIG. 5 is an explanatory diagram illustrating tag output in CMAC.
Figure 6A:
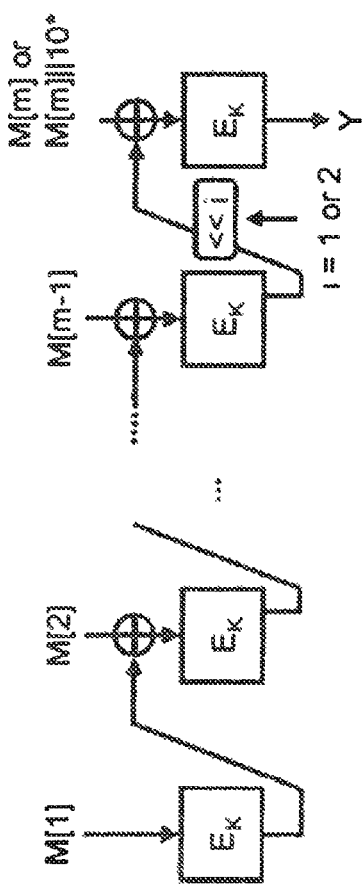
FIG. 6A is an explanatory diagram illustrating tag output in GCBC in the case where the number m of blocks of the message is 2 or more.
Figure 6B:
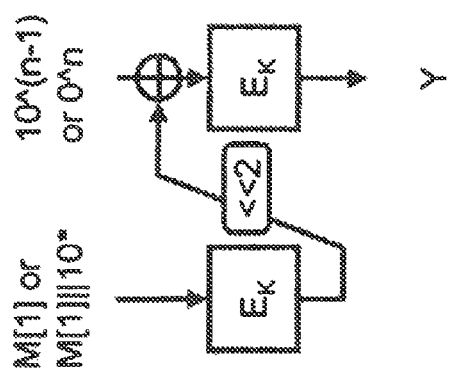
FIG. 6B is an explanatory diagram illustrating tag output in GCBC in the case where the number m of blocks of the message is 1.
Figure 7:
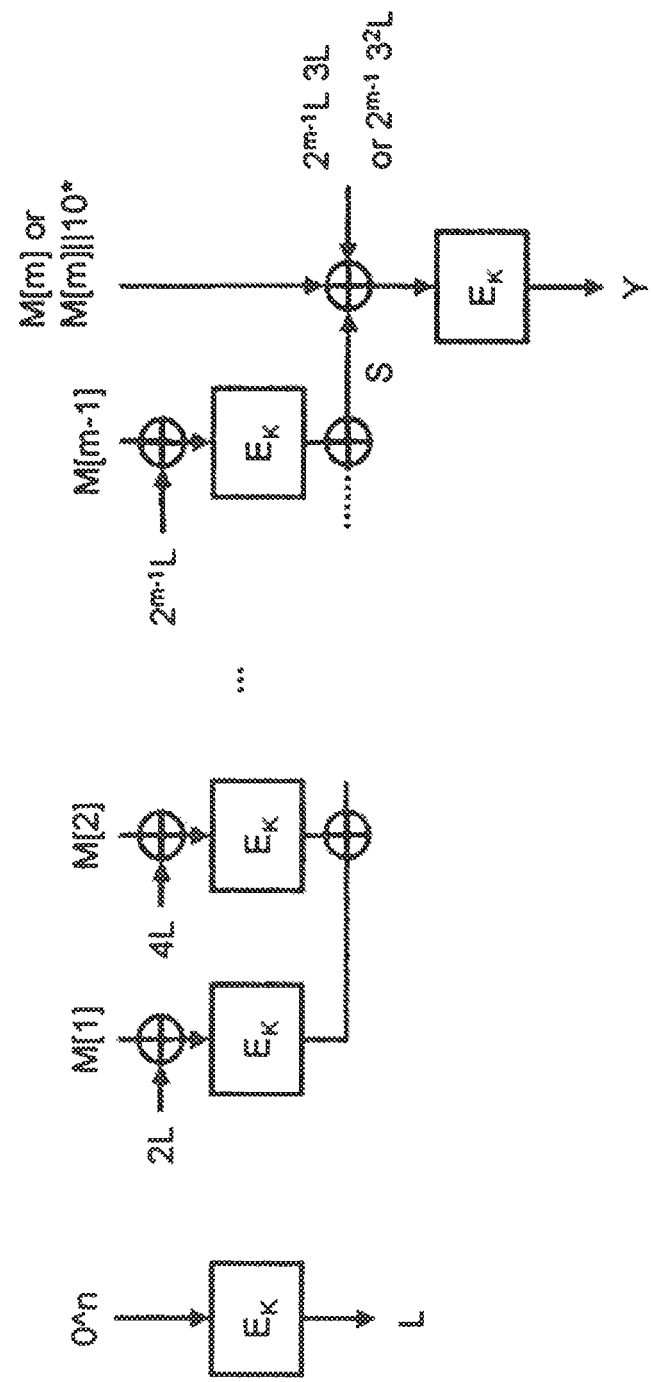
FIG. 7 is an explanatory diagram illustrating tag output in PMAC.

FIG. 4 is a flowchart illustrating the operation of the tag generation device in the exemplary embodiment 1.

First, upon input of the input message M, the input unit 100 divides the message M into n-bit blocks. In detail, the input unit 100 obtains M[1], M[2], ..., M[m] from the message M (step S101), where $|M[i]|=n$ for all $i=1, \ldots, m-1$, $1 \leq |M[m]| \leq n$. The number m of blocks can be expressed as ceiling($|M|/n$), i.e. $|M|\_n$, using the ceiling function.

In the case where the message M is one block, i.e. M=M[1] (step S102: yes), the input unit 100 outputs the message M directly to the last chunk hash unit 102. The last chunk hash unit 102 outputs the tag T computed from the message M, to the output unit 103 as the final output (step S103).

Otherwise (step S102: no), the input unit 100 outputs the message M to the intermediate chunk hash unit 101 as the initial value of the intermediate input. Here, in the case where the message M is less than or equal to u+2 blocks (step S104: yes), the input unit 100 outputs the message M not to the intermediate chunk hash unit 101 but to the last chunk hash unit 102. The last chunk hash unit 102 outputs the tag T computed from the message M, to the output unit 103 as the final output (step S106).

In the case where the message M is greater than or equal to u+3 blocks (step S104: no), the input unit 100 extracts the first u+1 blocks of the message M, and outputs the extracted blocks to the intermediate chunk hash unit 101. The intermediate chunk hash unit 101 hashes the received blocks of the message M, to obtain the output H as the intermediate output (step S105).

After the output H is obtained, the input unit 100 concatenates the output H and the remaining blocks of the message M, as the new intermediate input. The input unit 100 outputs the new intermediate input to the intermediate chunk hash unit 101. The input unit 100 and the intermediate chunk hash unit 101 repeat the process of steps S104 and S105 in sequence, until the number of blocks of the intermediate input, i.e. $|M|\_n$, becomes less than or equal to u+2.

In the case where the number of blocks of the intermediate input has become less than or equal to u+2 (step S104: yes), the input unit 100 outputs the whole intermediate input to the last chunk hash unit 102. The last chunk hash unit 102 outputs the tag T computed from the whole intermediate input, to the output unit 103 as the final output (step S106).

Lastly, the output unit 103 outputs the tag T to the display device or the like (step S107).

As described above, in this exemplary embodiment, the block cipher function $E_K$ is used only m times for the message M of m blocks if m is greater than or equal to 2, as illustrated in FIG. 2A. In other words, the process is completed with m block cipher calls. There is also no need to precompute a ciphertext $E(0^n)$ of a constant plaintext, unlike PMAC. Moreover, only one key K is used.

Further, in this exemplary embodiment, setting the predetermined parameter u to be equal to (or a multiple of) the number of parallelizable units makes it possible to always process a message in units of u blocks in parallel. The maximum possible value of u depends on the post-processing function pp used.

The condition to be satisfied by the post-processing function pp is to ensure that, when R is an n-bit uniform random number, the probability of the following Formula 7 holding true is sufficiently small for any n-bit value y and any subset $\{i\_1, i\_2, \ldots, i\_t\} \subseteq \{0, 1, \ldots, u, cst1, cst2\}$ of all parameter values.

$$pp(i\_1,R)+pp(i\_2,R)+ \ldots +pp(i\_t,R)=y \quad \text{(Formula 7)}.$$

For example, suppose n is a prime number satisfying a specific condition, in the case where pp(i, R) is an i-bit cyclic shift of R (the direction of the cyclic shift may be left or right as long as it is uniform) and the range of the argument i is limited to $\{0, 1, \ldots, n-2\}$. It is derived from the study result described in NPL 8 that the probability of Formula 7 holding true is a sufficiently small value $(2/2^n)$.

The block size n is normally a power of 2, such as 64 or 128, and so is not a prime number. However, the same effect can be attained by setting, as the part to be cyclically shifted, not the whole block but the prime number length satisfying the condition. For example, the maximum prime number less than or equal to 64 and satisfying the condition is 61, and the maximum prime number less than or equal to 128 and satisfying the condition is 107. By setting the pp function as the cyclic shift by such length, a sufficiently large number of parallelizable units, such as 57 or 103, can be achieved even when overhead due to reserved words or the like is taken into account.

PMAC has the structure in which the blocks except the last one block are all arranged in parallel, and so is in principle capable of parallel processing of up to m−1 units for a message of m blocks. In other words, PMAC has the property of unlimited parallelizability, that is, the property of being "fully parallelizable". In practice, however, the number of parallelizable units is typically limited in some way. The parallelizability achieved by the present invention is therefore sufficiently practical.

In this exemplary embodiment, for a message of two or more blocks, the last one block needs to be processed alone. This property that the last one block cannot be processed in parallel with the rest of the blocks is, however, the same as PMAC.

Thus, according to this exemplary embodiment, when generating a tag to be attached to a message, such tag generation that uses one block cipher key, requires a minimum number of block cipher calls for a message of two or more blocks, has a practically sufficient level of parallelizability, and needs no precomputation can be realized.

Moreover, in this exemplary embodiment, the message length of a message input to the MAC authentication tag generation device has no restriction. Hence, a message of any length can be processed according to this exemplary embodiment.

The present invention is applicable to message authentication in wireless or wired data communication, detection of tampering with a database, verification of the validity of memory in a device, and so on.

Figure 8:
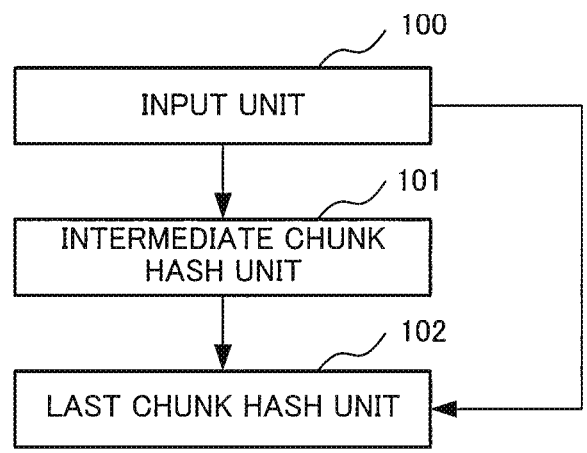
FIG. 8 is a block diagram illustrating the minimum structure of the tag generation device according to the present invention.

FIG. 8 is a block diagram illustrating the minimum structure of the tag generation device according to the present invention. As illustrated in FIG. 8, the tag generation device includes input unit 100 for dividing a message into a plurality of blocks. The tag generation device also includes intermediate chunk hash unit 101 for receiving blocks included in the message as a processing target, performing encryption processing and post-processing of encryption for blocks using one key in units of a predetermined number of blocks in parallel to generate an intermediate output, and repeating the encryption processing and the post-processing of encryption on a message obtained by concatenating the intermediate output and unprocessed blocks as a next processing target. The tag generation device further includes last chunk hash unit 102 for, in the case where the number of blocks of the message or the number of blocks of the message obtained by concatenating the intermediate output and the unprocessed blocks is less than or equal to a predetermined value, performing the encryption processing and the post-processing of encryption on the message to generate a tag.

With this structure, tag generation that uses one block cipher key, requires a minimum number of block cipher calls for a message of two or more blocks, has a practically sufficient level of parallelizability, and needs no precomputation can be realized.

The following tag generation device is also disclosed in the foregoing exemplary embodiment.

(1) The last chunk hash unit of the tag generation device holds any two constants cst_z1 and cst_z2, as additional parameters of the post-processing function pp(i, *) and applies, in the case where the input X' is less than n bits in length, a ciphertext obtained by encrypting any n-bit constant using the n-bit block cipher E to the post-processing function pp(i, *) having cst_z1 as a parameter to obtain a post-processing output block W, takes an exclusive-or of the post-processing output block W and the input X' that has been padded to n bits, encrypts the exclusive-or using the n-bit block cipher E, and outputs the encrypted exclusive-or as the tag. The last chunk hash unit applies, in the case where the input X' is n bits in length, the ciphertext to the post-processing function pp(i, *) having cst_z2 as a parameter to obtain the post-processing output block W, takes an exclusive-or of the post-processing output block W and the input X', encrypts the exclusive-or using the n-bit block cipher E, and outputs the encrypted exclusive-or as the tag. The input unit supplies the message M to the last chunk hash unit, in the case where the message M is less than or equal to n bits in length.

With this structure, tag generation that uses one block cipher key, requires a minimum number of block cipher calls for a message of two or more blocks, has a practically sufficient level of parallelizability, and needs no precomputation can be realized.

(2) The last chunk hash unit of the tag generation device holds any two constants cst_z1 and cst_z2, as additional parameters of the post-processing function pp(i, *) and applies, in the case where the input X' is less than n bits in length, a ciphertext obtained by encrypting any n-bit constant using the n-bit block cipher E to the post-processing function pp(i, *) having cst_z1 as a parameter to obtain a post-processing output block W, takes an exclusive-or of the post-processing output block W and the input X' that has been padded to n bits, encrypts the exclusive-or using the n-bit block cipher E, and outputs the encrypted exclusive-or as the tag. The last chunk hash unit applies, in the case where the input X' is n bits in length, the ciphertext to the post-processing function pp(i, *) having cst_z2 as a parameter to obtain the post-processing output block W, takes an exclusive-or of the post-processing output block W and the input X', encrypts the exclusive-or using the n-bit block cipher E, and outputs the encrypted exclusive-or as the tag. The input unit supplies the message M to the last chunk hash unit, in the case where the message M is less than or equal to n bits in length.

With this structure, tag generation that uses one block cipher key, has a practically sufficient level of parallelizability, and needs no precomputation can be realized for a message less than or equal to n bits in length, i.e. a message of one block. Moreover, since only two block cipher calls are needed, the number of necessary block cipher calls can be minimized even in the case where the message is one block.

(3) The post-processing function pp(i, *) of the tag generation device is a function of performing a cyclic shift not on a whole bit string subjected to the post-processing but on a bit string of a predetermined prime number length.

With this structure, a practically sufficient level of parallelizability can be achieved even in the case where the block size n by which the message is divided is not a prime number.

This application claims priority based on Japanese Patent Application No. 2013-041890 filed on Mar. 4, 2013, the disclosure of which is incorporated herein in its entirety.

Though the present invention has been described with reference to the foregoing exemplary embodiment, the present invention is not limited to the foregoing exemplary embodiment. Various changes understandable by those skilled in the art within the scope of the present invention can be made to the structures and details of the present invention.

REFERENCE SIGNS LIST

100 input unit
101 intermediate chunk hash unit
102 last chunk hash unit
103 output unit

The invention claimed is:

1. A tag generation device comprising:
a memory storing instructions; and
at least one processor configured to process the instructions to:
divide a message into a plurality of blocks,
receive blocks included in the message as a processing target, perform encryption processing and post-processing of encryption for blocks using one key in units of a predetermined number of blocks in parallel to generate an intermediate output, and repeat the encryption processing and the post-processing of encryption on a message obtained by concatenating the intermediate output and unprocessed blocks as a next processing target, and
when the number of blocks of the message or the number of blocks of the message obtained by concatenating the intermediate output and the unprocessed blocks is less than or equal to a predetermined value, perform the encryption processing and the post-processing of encryption on the message to generate a tag and output the tag to a tag verification device to authenticate the message.

2. The tag generation device according to claim 1, wherein the at least one processor is further configured to process the instructions to:
hold beforehand a positive integer u greater than or equal to 2, and an n-bit input and output post-processing function pp(i, *) having, as a parameter i, integers from 0 to u−1 and other positive integers cst1 and cst2,
encrypt, for an input X including u+1 n-bit blocks X[1], . . . , X[u+1], each block using an n-bit block cipher E, to obtain u n-bit ciphertexts E(X[1]), . . . , E(X[u]),
apply each obtained ciphertext E(X[i]) (i=1, . . . , u) to a post-processing function pp(i−1, *) having i−1 as a parameter, to obtain u post-processing output blocks pp(0, E(X[1])), . . . , pp(u−1, E(X[u])), and
output an exclusive-or $$pp(0,E(X[1]))+ \ldots +pp(u-1,E(X[u]))+X[u+1]$$

of an exclusive-or of the u post-processing output blocks pp(0, E(X[1])), . . . , pp(u−1, E(X[u])) and a (u+1)th block X[u+1] of the input X, as the intermediate output,
wherein, for an input X' including x blocks X'[1], . . . , X'[x] obtained by dividing data greater than or equal to 1 bit and less than or equal to n(u+2) bits in units of n bits, the last chunk hash unit, using the positive integer u and the post-processing function pp(i, *):
set an n-bit hash value S to an n-bit all-zero sequence 0^n, in the case where the number x of blocks is 2,
set the hash value S to an exclusive-or $$pp(0,E(X'[1]))+pp(1,E(X'[2]))+ \ldots +pp(x-3,E(X'[x-2]))$$

of x−2 post-processing output blocks pp(0, E (X'[1])), . . . , pp(x−3, E (X'[x−2])) obtained by encrypting each block X'[i] (i=1, . . . , x−2) using the n-bit block cipher E and then applying the encrypted block to the post-processing function pp(i−1, *) having i−1 as a parameter, in the case where the number x of blocks is greater than 2,
encrypt a block X'[x−1] immediately preceding a last block X'[x] of the input X' using the n-bit block cipher, to obtain a block U,
apply, when the last block X'[x] is n bits in length, the block U to the post-processing function pp(i, *) having cst1 as a parameter to obtain a post-processing output block V, take an exclusive-or of the hash value S, the post-processing output block V, and the last block X'[x], encrypt the exclusive-or using the n-bit block cipher E, and output the encrypted exclusive-or as the tag, and
apply, when the last block X'[x] is less than n bits in length, the block U to the post-processing function pp(i, *) having cst2 as a parameter to obtain the post-processing output block V, take an exclusive-or of the hash value S, the last block X'[x] that has been padded to n bits, and the post-processing output block V, encrypt the exclusive-or using the n-bit block cipher E, and output the encrypted exclusive-or as the tag, and
wherein the at least one processor is further configured to process the instructions to:
set an input message M as an initial value of an intermediate input,
divide the intermediate input in units of n bits,
supply a first to (u+1)th blocks,
acquire the intermediate output,
concatenate the intermediate output and a (u+2)th and succeeding blocks of the intermediate input, as a new intermediate input,
repeat the supply to the intermediate chunk hash unit until the intermediate input becomes less than or equal to u+2 blocks, and
supply the whole intermediate input when the intermediate input becomes less than or equal to u+2 blocks.

3. The tag generation device according to claim 2, wherein the at least one processor is further configured to process the instructions to:
hold any two constants cst_z1 and cst_z2, as additional parameters of the post-processing function pp(i, *),
apply, when the input X' is less than n bits in length, a ciphertext obtained by encrypting any n-bit constant using the n-bit block cipher E to the post-processing function pp(i, *) having cst_z1 as a parameter to obtain a post-processing output block W, take an exclusive-or of the post-processing output block W and the input X' that has been padded to n bits, encrypt the exclusive-or using the n-bit block cipher E, and output the encrypted exclusive-or as the tag, and
apply, when the input X' is n bits in length, the ciphertext to the post-processing function pp(i, *) having cst_z2 as a parameter to obtain the post-processing output block W, take an exclusive-or of the post-processing output block W and the input X', encrypt the exclusive-or using the n-bit block cipher E, and output the encrypted exclusive-or as the tag, and
wherein the at least one processor is configured to process the instructions to supply the message M, when the message M is less than or equal to n bits in length.

4. The tag generation device according to claim 3, wherein the post-processing function pp(i, *) is a function of performing a cyclic shift on a bit string of a predetermined prime number length.

5. The tag generation device according to claim 2, wherein the post-processing function pp(i, *) is a function of performing a cyclic shift on a bit string of a predetermined prime number length.

6. A tag generation method comprising:
dividing, by at least one processor, a message into a plurality of blocks;
receiving, by the at least one processor, blocks included in the message as a processing target, performing encryption processing and post-processing of encryption for blocks using one key in units of a predetermined number of blocks in parallel to generate an intermediate output, and repeating the encryption processing and the post-processing of encryption on a message obtained by concatenating the intermediate output and unprocessed blocks as a next processing target; and performing, when the number of blocks of the message or the number of blocks of the message obtained by concatenating the intermediate output and the unprocessed blocks is less than or equal to a predetermined value, by the at least one processor, the encryption processing and the post-processing of encryption on the message to generate a tag, and outputting the tag to a tag verification device to authenticate the message.

7. A non-transitory computer readable medium storing a tag generation program for causing a computer to execute:

dividing, by at least one processor, a message into a plurality of blocks;

receiving, by the at least one processor, blocks included in the message as a processing target, performing encryption processing and post-processing of encryption for blocks using one key in units of a predetermined number of blocks in parallel to generate an intermediate output, and repeating the encryption processing and the post-processing of encryption on a message obtained by concatenating the intermediate output and unprocessed blocks as a next processing target; and when the number of blocks of the message or the number of blocks of the message obtained by concatenating the intermediate output and the unprocessed blocks is less than or equal to a predetermined value, performing, by the at least one processor, the encryption processing and the post-processing of encryption on the message to generate a tag, and outputting the tag to a tag verification device to authenticate the message.

* * * * *